(12) United States Patent
Fritz et al.

(10) Patent No.: US 6,234,152 B1
(45) Date of Patent: May 22, 2001

(54) METHOD OF CHECKING THE OPERABILITY OF A TANK-VENTING SYSTEM

(75) Inventors: Thorsten Fritz, Gaggenau; Lutz Reuschenbach, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/372,061

(22) Filed: Aug. 11, 1999

(30) Foreign Application Priority Data

Aug. 14, 1998 (DE) .............................................. 198 36 967

(51) Int. Cl.$^7$ .................................................. F02M 33/02
(52) U.S. Cl. ................................................. 123/520; 73/40
(58) Field of Search .................................... 123/518, 519, 123/520, 521; 73/40, 49.2

(56) References Cited

U.S. PATENT DOCUMENTS

| | | | | |
|---|---|---|---|---|
| 5,349,935 | * | 9/1994 | Mezger et al. ........................ | 123/520 |
| 5,460,141 | * | 10/1995 | Denz et al. ........................... | 123/520 |
| 5,553,577 | * | 9/1996 | Denz et al. ........................... | 123/520 |
| 5,890,474 | * | 4/1999 | Schnaibel et al. .................... | 123/520 |
| 6,105,557 | * | 8/2000 | Schnaibel et al. .................... | 123/520 |

\* cited by examiner

Primary Examiner—Andrew M. Dolinar
Assistant Examiner—Arnold Castro
(74) Attorney, Agent, or Firm—Walter Ottesen

(57) ABSTRACT

The invention is directed to a method for checking the operability of a tank-venting system of a vehicle. A pressure source introduces an overpressure into the tank-venting system with the pressure source having operating characteristic variables. A conclusion is drawn as to the ambient temperature from one of the operating characteristic variables and a determination is made as to whether the ambient temperature lies within a pregiven temperature interval. Only if the ambient temperature lies within the pregiven temperature interval is an overpressure introduced into the tank-venting system relative to atmospheric pressure. One of the operating characteristic variables of the pressure source is detected as the overpressure is introduced into the tank-venting system to obtain a pressure trace of the pressure in the tank-venting system. A conclusion as to the presence of a leak in the tank-venting system is drawn from the pressure trace.

7 Claims, 1 Drawing Sheet

METHOD OF CHECKING THE OPERABILITY OF A TANK-VENTING SYSTEM

FIELD OF THE INVENTION

The invention relates to a method for checking the operability of a vessel and especially of a tank-venting system. The tank-venting system includes a tank and an adsorption filter having a venting line. The adsorption filter is connected to the tank via a connecting line and the system further includes a tank-venting valve which is connected to the adsorption filter via a valve line. In the method, an overpressure is introduced into the vessel compared to atmospheric pressure with a pressure source. To determine a pressure trace, the operating variable of the pressure source is detected during introduction of the overpressure and a conclusion is drawn therefrom as to the presence of a leak.

BACKGROUND OF THE INVENTION

A method of this kind for checking the operability of a tank-venting system is disclosed, for example, in U.S. Pat. No. 5,890,474 and in U.S. patent application Ser. No. 09/263,787, filed Mar. 5, 1999.

In many cases, it is desirable to undertake the check of the operability of the tank-venting system in vehicles only within certain temperature ranges. The diagnosis of the tank-venting system should not be carried out above or below certain ambient temperatures because, on the one hand, the service life of the seal elements in the valves, lines and the like is shortened by high temperatures and, on the other hand, the reliable operability of components of this kind cannot be guaranteed at low temperatures.

SUMMARY OF THE INVENTION

It is an object of the invention to improve a method for checking the operability of a vessel and especially of a tank-venting system in that a detection of the ambient temperature is made with the least possible complexity.

The method of the invention is for checking the operability of a tank-venting system of a vehicle having an engine. The tank-venting system includes: a tank; an adsorption filter having a venting line; a first connecting line connecting the adsorption filter to the tank; a tank-venting valve; and, a second connecting line connecting the tank-venting valve to the adsorption filter. The method includes the steps of: providing a pressure source for introducing an overpressure into the tank-venting system with the pressure source having operating characteristic variables; drawing a conclusion as to the ambient temperature from one of the operating characteristic variables and determining whether the ambient temperature lies within a pregiven temperature interval; only if the ambient temperature lies within the pregiven temperature interval, then introducing an overpressure into the tank-venting system relative to atmospheric pressure; detecting one of the operating characteristic variables of the pressure source as the overpressure is introduced into the tank-venting system to obtain a pressure trace of the pressure in the tank-venting system; and, drawing a conclusion as to the presence of a leak in the tank-venting system from the pressure trace.

The detection of the ambient temperature from one or more operating variables of the pressure source and the determination of the pressure trace from these operating characteristic variables have the significant advantage that additional temperature sensors are not needed. By applying overpressure to the vessel only when the detected temperature lies within a pregiven temperature interval ensures that a check of the operability of the vessel only takes place in the pregiven desired temperature interval and that a check of this kind affords reliable test results.

Advantageously, a pump driven by an electric motor is used as the pressure source and the ambient temperature is determined from the coil resistance of the electric motor of this pump. In this way, one can advantageously use electric variables which must anyway be detected for the determination of the pressure trace to check as to operability.

In principle, it would be possible to detect the operating characteristic variables of the pressure source in advance based on a comparison leak and to store the same in a memory to compare operating variables, which are detected in later measurements, to these operating characteristic values stored in the memory and to draw a conclusion as to the presence of a leak. In this way, the conclusion as to the presence of a leak can be reached relatively precisely. However, it is not possible, for example, to consider deterioration effects of the tank-venting system or of the vehicle or even other variables which influence the measurement with this method.

For the above reason, an especially advantageous solution provides for applying overpressure alternately to the tank-venting system and a reference leak and that the operating characteristic variables of the pressure source are detected during the introduction of the pressure into the tank-venting system and during the introduction of the pressure into the reference leak and the two operating characteristic variables are compared and the presence of a leak is concluded therefrom. This advantageous solution considers especially the different operating states of the vehicle and especially also operating states which are caused by deterioration.

The provision of a reference leak has, in addition, the significant advantage that representative comparative operating characteristic variables for a leak, which is present, do not have to be stored and the memory can therefore be omitted.

An advantageous embodiment provides that the reference leak can be connected in parallel to the tank-venting system and this provides an especially good reference measurement.

In another advantageous embodiment, the reference leak is simulated by a controlled partially opened tank-venting valve. For this reason, an additional reference leak branch in the tank-venting system can be omitted. With this controlled partial opening of the tank-venting valve, any desired leak size can be realized in an especially advantageous manner.

BRIEF DESCRIPTION OF THE DRAWINGS

The invention will now be described with reference to the single FIGURE (FIG. 1) of the drawing which is a schematic of an embodiment of an arrangement for checking the operability of a tank-venting system which can be used with the method according to the invention.

DESCRIPTION OF THE PREFERRED EMBODIMENTS OF THE INVENTION

Figure 1:
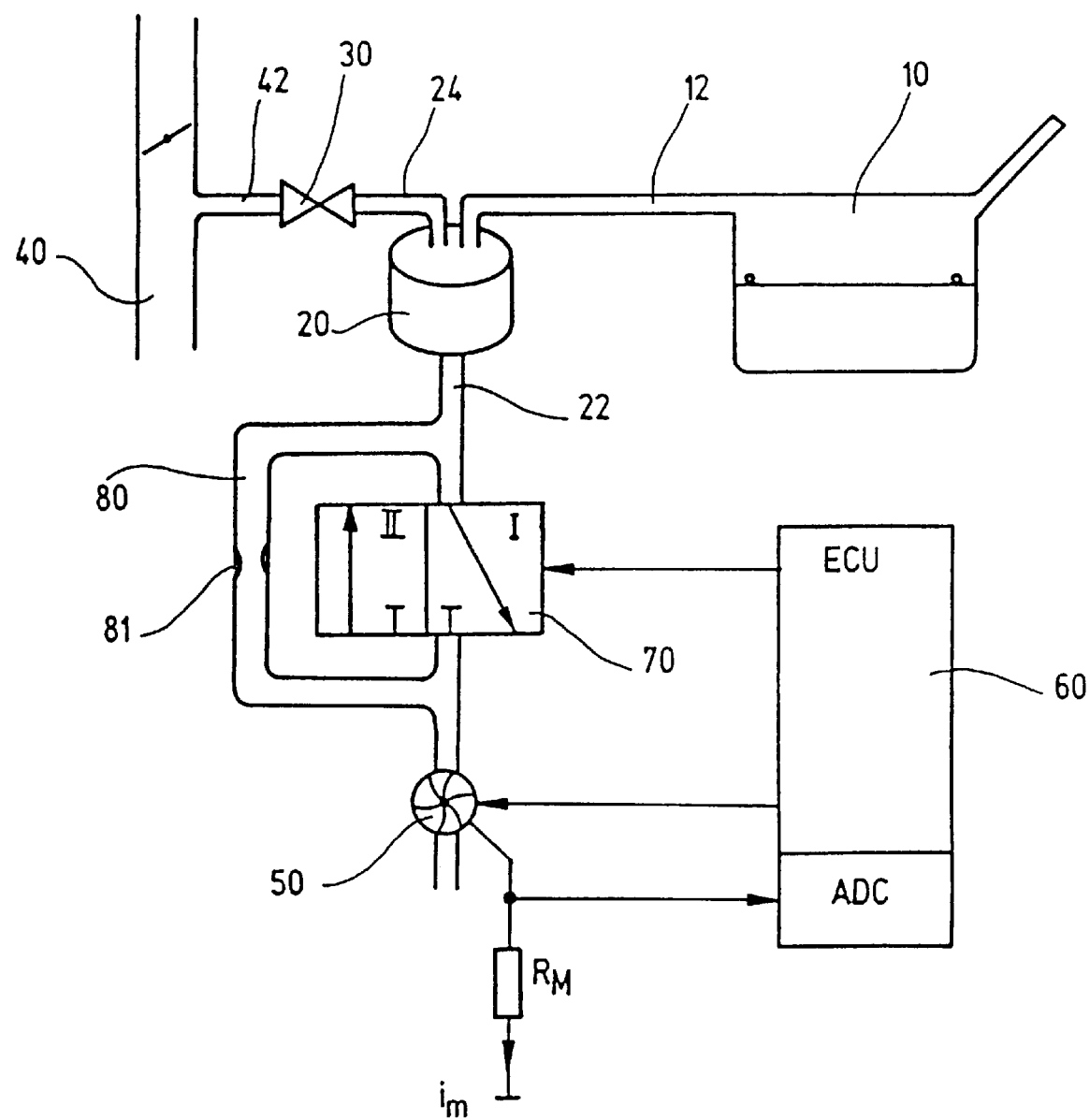

A method for checking the operability of a tank-venting system in a pregiven temperature interval will now be described with respect to the tank-venting system shown in FIG. 1. It is understood, that in lieu of a tank-venting system, any desired vessel can be checked as to its operability in accordance with the method of the invention.

The tank-venting system includes a tank 10 and an adsorption filter 20 which is connected to the tank 10 via a tank-connecting line 12. The adsorption filter 20 can, for example, be an active charcoal filter and has a venting line 22 which can be connected to the ambient. The tank-venting system further includes a tank-venting valve 30 which, on the one hand, is connected to the adsorption filter 20 via a valve line 24 and, on the other hand, is connected to the intake manifold 40 of an internal combustion engine via a valve line 42.

Hydrocarbons occur in the tank 10 because of vaporization and these hydrocarbons deposit in the adsorption filter 20. The tank-venting valve 30 is opened to regenerate the adsorption filter 20 so that air of the atmosphere is drawn by suction through the adsorption filter because of the underpressure present in the intake manifold 40. In this way, the hydrocarbons, which have deposited in the adsorption filter, are drawn by suction into the intake manifold 40 and are supplied to the engine (not shown).

A pump 50 is provided in order to diagnose the operability of the tank-venting system. The pump 50 is connected to a circuit unit 60 and a switchover valve 70 is connected downstream of the pump. The switchover valve can, for example, be in the form of a 3/2-directional valve. A reference leak 81 is arranged in a separate branch 80 parallel to this switchover valve 70. The size of the reference leak 81 is so selected that it corresponds to the size of the leak to be detected.

It is understood that the reference leak 81 can, for example, also be part of the switchover valve 70. Here, the reference leak can be a channel constriction or the like so that an additional reference part can be omitted in this case.

Furthermore, the reference leak can also be simulated by a controlled opening of the tank-venting valve 30. Here, especially different sizes of reference leaks can be simulated.

The tightness check of the tank-venting system is disclosed in U.S. Pat. No. 5,890,474 which is incorporated by reference herein. In this check, the current supplied to the pump motor is detected to determine whether the flow rate, which is to be introduced by the pump 50 into the tank-venting system, deviates from the flow rate which is present when introducing the overpressure via the reference leak.

In the position of the switchover valve 70 identified by reference numeral I, a flow rate is introduced by the pressure source 50 via the reference leak into the tank-venting system. Here, a motor current $i_m$ results which is essentially constant over time. As soon as the switchover valve 70 is switched over from the position I into the position II, the pressure source 50 charges the tank-venting system with an overpressure. At switchover, the motor current $i_m$ at first drops and thereafter, if there is no leak, continues to increase over time until a value is reached which is greater or equal to the motor current $i_m$ in the position I of the switchover valve. A conclusion can be drawn as to tightness of the tank-venting system based on this current $i_m$.

The winding current of the electric motor, which drives the pump 50, is detected in order to preclude a diagnosis of the kind described above outside of a pregiven temperature interval. This can take place, for example, via the current $i_m$ and the voltage, which is supplied to the pump 50 always when the pump is not generating an overpressure in the tank-venting system; that is, for example, in advance of the above-described diagnosis.

A conclusion can be drawn as to the ambient temperature from the winding resistance of the electric motor which drives the pump 50 via a characteristic field or the like. Such a detection of the ambient temperature not only has the significant advantage that additional temperature sensors can be omitted but that the detection of the ambient temperature can take place directly in the region of the tank-venting system. This is especially advantageous because, in many cases, internal combustion engines of vehicles develop a very considerable amount of heat which could lead to incorrect measurement results if, for example, a temperature sensor would be mounted remotely from the engine, for example, in the front area of the vehicle as known from the state of the art.

A diagnosis of the tank-venting system as described in U.S. Pat. No. 5,890,474 or in U.S. patent application Ser. No. 09/263,787, filed Mar. 5, 1999, only takes place when the ambient temperature, which is detected in this manner, lies within a pregiven interval which is so selected that reliable statements as to the operability of the tank-venting system can be made.

It is understood that the foregoing description is that of the preferred embodiments of the invention and that various changes and modifications may be made thereto without departing from the spirit and scope of the invention as defined in the appended claims.

What is claimed is:

1. A method for checking the operability of a tank-venting system of a vehicle, the tank-venting system including: a tank; an adsorption filter having a venting line; a first connecting line connecting said adsorption filter to said tank; a tank-venting valve; and, a second connecting line connecting said tank-venting valve to said adsorption filter, the method comprising the steps of:

providing a pressure source for introducing an overpressure into said tank-venting system with said pressure source having operating characteristic variables;

drawing a conclusion as to the ambient temperature from one of said operating characteristic variables of said pressure source and determining whether said ambient temperature lies within a pregiven temperature interval;

only if said ambient temperature lies within said pregiven temperature interval, then introducing an overpressure into said tank-venting system relative to atmospheric pressure;

detecting one of said operating characteristic variables of said pressure source as said overpressure is introduced into said vessel to obtain a pressure trace of the pressure in said tank-venting system; and, drawing a conclusion as to the presence of a leak in said vessel from said pressure trace.

2. The method of claim 1, said pressure source being an electric motor driven pump having a winding through which winding current flows during operation of said pump; and, said method comprising the further step of determining the ambient temperature from said winding current.

3. The method of claim 1, comprising the further step of:

providing a reference leak connected in parallel with said tank-venting system;

alternately introducing an overpressure into said tank-venting system and said reference leak;

detecting said one operating characteristic variable while introducing said overpressure into said tank-venting system to obtain a first pressure trace and again while introducing said overpressure into said reference leak to obtain a second pressure trace;

comparing said first and second pressure traces to each other; and, drawing a conclusion as to the presence of a leak in said tank-venting system from the comparison of said first and second pressure traces.

4. The method of claim 3, wherein said pressure source is switched between said tank-venting system and said reference leak.

5. The method of claim 3, comprising the further step of controlling said tank-venting valve to be partially open to simulate said reference leak.

6. A method for checking the operability of a vessel, the method comprising the steps of:

providing a pressure source for introducing an overpressure into said vessel with said pressure source having operating characteristic variables;

drawing a conclusion as to the ambient temperature from one of said operating characteristic variables of said pressure source and determining whether said ambient temperature lies within a pregiven temperature interval;

only if said ambient temperature lies within said pregiven temperature interval, then introducing an overpressure into said vessel relative to atmospheric pressure;

detecting one of said operating characteristic variables of said pressure source as said overpressure is introduced into said vessel to obtain a pressure trace of the pressure in said vessel; and, drawing a conclusion as to the presence of a leak in said vessel from said pressure trace.

7. The method of claim 5, said vessel being a tank-venting system of a motor vehicle.

* * * * *

UNITED STATES PATENT AND TRADEMARK OFFICE
CERTIFICATE OF CORRECTION

PATENT NO. : 6,234,152 B1
DATED : May 22, 2001
INVENTOR(S) : Thorsten Fritz and Lutz Reuschenbach It is certified that error appears in the above-identified patent and that said Letters Patent is hereby corrected as shown below:

Column 6,
Line 13, delete "claim 5" and substitute -- claim 6 --

Signed and Sealed this

Twenty-fifth Day of February, 2003

JAMES E. ROGAN
*Director of the United States Patent and Trademark Office*